United States Patent Office 2,829,170
Patented Apr. 1, 1958

2,829,170

PROCESS FOR DECOBALTING A LIQUID CARBONYLATE

Frank J. Moore, Wappingers Falls, N. Y., assignor to The Texas Company, New York, N. Y., a corporation of Delaware No Drawing. Application July 26, 1954
Serial No. 445,905

3 Claims. (Cl. 260—604)

This invention relates to a process for removing metallic solute from oxygen-containing organic compounds and more particularly to a process for precipitating metals of the iron transitional group of the periodic table (cobalt, nickel and iron) out of liquid products resulting from catalytic introduction of carbon monoxide into an organic molecule, i. e., the process of carbonylation or oxo process.

The catalyst used in the carbonylation reaction may be a carbonyl and/or hydrocarbonyl of cobalt, nickel or iron, or a compound convertible to these carbonyls under reaction conditions. Cobalt catalysts are the ones most widely used. If the carbonylation reaction mixture, which for convenience herein I have termed a "carbonylate," is liquid when it issues from the reactor it will contain appreciable quantities of metal carbonyl solute, e. g., cobalt tetracarbonyl and cobalt hydrocarbonyl. Carbon monoxide is stripped from and the metal itself precipitated from carbonylate in the presence of a stripping gas such as hydrogen or methane at elevated temperature to rid the stream of metal solute. The precipitated metal can be recovered by reconverting it into catalyst with carbon monoxide and hydrogen, and dissolving the catalyst in a stream of organic solvent such as benzene, toluene, or fresh feed for a subsequent carbonylation reaction.

Broadly my invention is an improvement in a process for removing metal from a liquid carbonylate containing carbonyl solute of a metal of the iron transitional group of the periodic table wherein carbon monoxide is stripped from and said metal precipitated from the carbonylate; it comprises passing the liquid carbonylate over metal having close-packed crystal structure and metallic radii from 1.265 to 1.425 angstrom units for coordination number 12.

Previously it has been proposed to deposit metal from the carbonylate onto a bed of inert material such as clay, pumice, or infusorial earth optionally coated with cobalt metal. When a fresh bed of the inert material is used for the metal deposition it has been found that there is generally an undesirable induction period which can last as long as several hours before satisfactory metal removal from the carbonylate stream commences. Various other problems can arise when the bed is coated with cobalt metal because both the bed coating and the fresh metal precipitate are capable of forming carbonyl solute readily. As a consequence uniformity of the coating is sometimes difficult to maintain over a long series of alternating precipitation and bed cleaning cycles, and unexpected flow distribution or even bed plugging is likely to occur. Furthermore, the cobalt coating is apt to be almost completely cleaned off parts of the bed, thereby changing the bed characteristics as to those parts.

Advantages of my invention include its small induction period, if any, before satisfactory metal removal from the carbonyl stream commences, its obviation of risk of converting bed surface into carbonyl solute during bed cleaning, its general applicability irrespective of the particular iron group carbonyl in the carbonylate stream, its durability, and its ability to reduce the metal content of the carbonylate to extremely low values.

The metals for forming the surfaces are characterized by the following properties: they have close-packed crystal structure, i. e., face-centered cubic or hexagonal close-packed; and their metallic radii are from 1.265 to 1.425 angstrom units for coordination number 12. A standard set of metallic radii for 12 coordination is given in Table 27 on page 549 of Wells Structural Inorganic Chemistry, the Clarendon Press, Oxford, England (1945). The values for metallic radii given in this table are those adopted as the standard of reference throughout this specification. Specifically suitable metals for practice of my invention include copper, rhodium, palladium, iridium and platinum which have cubic close-packed (face-centered) crystal structure and zinc, ruthenium, rhenium and osmium which have hexagonal close-packed crystal structure. Alloys of these metals can be used also.

While it is not intended that consideration of this invention be limited or prejudiced by any theory or other explanation, the following is offered as one possible reason why the use of these metal surfaces are particularly effective: as metal carbonyl solute decomposes in the carbonylate there occurs liberation of metal particles having perhaps amorphous structure; the structure of the receptive bed surface is such that it accelerates transformation of these amorphous particles into crystal form whereby they plate out on the bed with rapidity. After a short period of running the bed has picked up an amount of deposited metal which itself assists in forming crystal aggregates and which accumulates until operation is terminated.

The form of the receptive metal for the practice of my invention may take practically any shape. The receptive metal can be in the form of pellets, bars, rods, turnings or irregular particles, or it can be coated on a support such as clay, pumice, carbon, diatomaceous earth, silica and the like. Application of the desired receptive metal onto an inert support can be done in a number of ways, e. g., the hydrogen reduction of metal oxide on inert supporting particles. The thickness of the metal coating on supporting medium can be controlled or coated particles can be mixed with solid metal particles to obtain a wide variation in heat capacity or heat conducting properties of the entire bed or selected portions thereof.

The size of the particles constituting a bed for the practice of my invention should be sufficiently large and uniform to give good flow characteristics. The volume of the bed can be adjusted to obtain the desired amount of metal pick-up for a given flow rate of a particular carbonylate. I have found that a fixed bed of individual particles between about 6 and about 20 mesh size (U. S. standard screen size) is quite effective in the practice of my process and therefore prefer to use such bed. However, it is sometimes advantageous to use particles as large as one quarter of an inch across or even larger when a high flow rate is desired through a long bed. Particles as small as 40 and 50 mesh (U. S. standard screen size) can be used also, especially in small scale operations where a low flow rate is not objectionable. My invention can also be adapted for use with moving or with fluidized beds.

Of the various metals suitable for the practice of my invention copper is the one preferred because of its efficacy and low cost. The price of most of the other suitable metals is such that their use is considerably less attractive.

Flow direction of a carbonylate stream relative to stripping gas in the practice of my invention can be concurrent or counter-current. The carbonylate can be introduced into the bed at the top, at the bottom, or at a plurality of feed points. Total pressure should be sufficient to maintain the carbonylate in liquid form. Pressure can be as high as 5,000 lbs. per sq. inch gage, and preferably it is maintained between 500 and 3,000 lbs. per sq. inch gage. Temperature of the operation is maintained between about 200° and about 400° F. For efficiency and economy of cobalt removal temperature of about 300°–350° F. is preferred; more drastic temperature conditions are sometimes necessary to remove the other metals of the iron sub-group most efficiently from a carbonylate.

Concentration of catalyst metal dissolved in the carbonylate as it issues from the carbonylation reactor may be as high as about three-tenths of a percent by weight. It has been found advantageous to reduce the percent metal in the carbonylate to as low as a few thousandths of 1% or less preparatory to subsequent treatment. Thus in one of the most important commercial operations involving carbonylation, namely that of low temperature-high pressure conversion of olefins into aldehydes and/or ketones with carbon monoxide and hydrogen in the presence of cobalt catalyst for subsequent hydrogenation of the olefinic carbonylate into alcohols, the carbonylate is almost completely decobalted before hydrogenation is started. By so doing cobalt deposition on the hydrogenation catalyst and its various attendant physical and chemical problems are minimized, e. g., plugging of the hydrogenation catalyst and catalysis of secondary reactions during hydrogenation.

My process is especially well adapted to processing carbonylates whose parent structures are aliphatic or naphthenic hydrocarbons having an olefinic carbon-to-carbon bond in the molecule (i. e., olefinic carbonylates) and especially to processing carbonylates whose parent hydrocarbons of this type have 2–18 carbon atoms in the molecule, e. g., ethylene, butylenes, heptylenes and nonylenes. The parent hydrocarbon can be one which occurs in nature, or it can be one which has been synthesized from other substances, e. g., one which is a polymer of lower molecular weight hydrocarbons.

The following example shows one way in which my invention has been practiced but is not to be construed as limiting it.

*Example*

A half-liter bed of 10–20 mesh (U. S. standard screen size) pumice particles coated with copper was held in a vertical 1½" internal diameter stainless steel reactor. The reactor contained a thermowell and was jacketed with electric heating elements for controlling temperature. A stream of hydrogen gas was introduced into the bottom of the bed at the rate of 1 cu. ft. per hour (referred to temperature and pressure conditions of 60° F. and 760 mm. Hg absolute). Exhaust gases were vented continuously from the top of the reactor. Liquid heptylene carbonylate containing 0.21% by weight cobalt in the form of cobalt solute was introduced into the top of the bed at rate sufficient to establish and maintain hourly space velocity of 2. Effluent carbonylate was withdrawn continuously from the bottom of the reactor. The decobalting of the carbonylate was conducted for six hours at a total pressure of 1,000 p. s. i. g. and temperature in the reactor was maintained between 304° and 311° F.

The lack of color in the effluent carbonylate shortly after commencing operation indicated absence of an appreciable induction period prior to effective decobalting. Cobalt content of the effluent carbonylate, measured hourly, was between one and three ten-thousandths of 1% by weight.

Obviously, many modifications and variations of the invention, as hereinbefore set forth, may be made without departing from the spirit and scope thereof, and therefore only such limitations should be imposed as are indicated in the appended claims.

I claim:

1. In a process for decobalting a carbonylate wherein carbon monoxide is stripped from and cobalt metal precipitated from the carbonylate, the improvement which comprises passing the carbonylate at liquid phase at 200–400° F. through a bed of solid particles at least the surface of which comprises copper metal.

2. The process of claim 1 wherein the carbonylate is the reaction product of an olefinic hydrocarbon with carbon monoxide and hydrogen.

3. The process of claim 1 wherein said temperature is 300–350° F. and the pressure during said decobalting is between 500 and 3000 p. s. i. g.

References Cited in the file of this patent

UNITED STATES PATENTS

| | | |
|---|---|---|
| 637,140 | Martino et al. | Nov. 14, 1899 |
| 1,164,141 | Sulzberger | Dec. 14, 1915 |
| 1,382,361 | Hybinette | June 21, 1921 |
| 1,783,662 | Marx | Dec. 2, 1930 |
| 1,890,856 | Lewin | Dec. 13, 1932 |
| 2,365,094 | Michael et al. | Dec. 12, 1944 |
| 2,396,569 | Griffith et al. | Mar. 12, 1946 |
| 2,523,461 | Young et al. | Sept. 26, 1950 |
| 2,602,807 | Morris et al. | July 8, 1952 |
| 2,604,442 | Lambert et al. | July 22, 1952 |
| 2,650,204 | Reynolds et al. | Aug. 25, 1953 |
| 2,663,630 | Schlecht et al. | Dec. 22, 1953 |

FOREIGN PATENTS

| | | |
|---|---|---|
| 655,149 | Great Britain | July 11, 1951 |
| 824,198 | Germany | Dec. 10, 1951 |